United States Patent
Kondou et al.

(10) Patent No.: US 8,693,166 B2
(45) Date of Patent: Apr. 8, 2014

(54) CAPACITOR

(75) Inventors: Keiichi Kondou, Hyogo (JP); Hideki Shimamoto, Kyoto (JP); Yukihiro Shimasaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 389 days.

(21) Appl. No.: 12/599,557

(22) PCT Filed: Jun. 5, 2008

(86) PCT No.: PCT/JP2008/001434
§ 371 (c)(1),
(2), (4) Date: Nov. 10, 2009

(87) PCT Pub. No.: WO2008/152788
PCT Pub. Date: Dec. 18, 2008

(65) Prior Publication Data
US 2011/0128672 A1   Jun. 2, 2011

(30) Foreign Application Priority Data

Jun. 13, 2007 (JP) ................................. 2007-156024
Jun. 13, 2007 (JP) ................................. 2007-156025

(51) Int. Cl.
*H01G 9/00* (2006.01)
*H01G 9/02* (2006.01)
*H01M 2/16* (2006.01)

(52) U.S. Cl.
USPC ............ 361/500; 361/502; 361/512; 429/246

(58) Field of Classification Search
USPC ........................... 361/500, 502, 512; 429/246
See application file for complete search history.

(56) References Cited

U.S. PATENT DOCUMENTS

2009/0123840 A1 * 5/2009 Shirane et al. ................. 429/220

FOREIGN PATENT DOCUMENTS

| JP | 64-014882 A | 1/1989 | |
|---|---|---|---|
| JP | 08-064213 A | 3/1996 | |
| JP | 08-107048 A | 4/1996 | |
| JP | 10-270293 A | 10/1998 | |
| JP | 2003-109654 A | 4/2003 | |
| JP | 2003109654 A * | 4/2003 | ............ H01M 10/04 |
| JP | 2004-185813 A | 7/2004 | |

(Continued)

OTHER PUBLICATIONS

Machine Translation of JP-08-064213-A, which was previously filed on Nov. 10, 2009.

(Continued)

*Primary Examiner* — Eric Thomas
*Assistant Examiner* — Arun Ramaswamy
(74) *Attorney, Agent, or Firm* — Pearne & Gordon LLP (57) ABSTRACT

A capacitor includes a first collector made of metal foil, a first electrode layer placed on a surface of the first collector and mainly containing a carbonaceous material, a resin layer provided on the first electrode layer, a second electrode provided on the resin layer and mainly containing a carbonaceous material, a second collector provided on the second electrode layer and made of metal foil, a case accommodating the first collector, the first electrode layer, the resin layer, the second electrode, and the second collector therein, and an electrolyte accommodated in the case. The resin layer has a non-woven fabric form of fibers made of resin irregularly bonded to one another. The fibers of the resin layer intertwine with the first electrode layer. The fibers of the resin layer intertwine with the first electrode layer. This capacitor can be thin and small.

19 Claims, 8 Drawing Sheets

(56) References Cited

FOREIGN PATENT DOCUMENTS

| JP | 2006-286919 A | 10/2006 |
| JP | 2006286919 A * | 10/2006 |
| WO | WO 2007074654 A1 * | 7/2007 |

OTHER PUBLICATIONS

Machine Translation of JP-08-107048-A, which was previously filed on Nov. 10, 2009.
Machine Translation of JP-10-270293-A, which was previously filed on Nov. 10, 2009.
Machine Translation of JP-2003-109654-A, which was previously filed on Nov. 10, 2009.
Machine Translation of JP-2004-185813-A, which was previously filed on Nov. 10, 2009.
Machine Translation of JP-2006-286919-A, which was previously filed on Nov. 10, 2009.
International Search Report for PCT/JP2008/001434.
English Translation of Chinese Office Action for 200880016346.3 dated Oct. 10, 2011.

* cited by examiner

| | Thickness of Polarizable Layer T1 (μm) | Thickness of Resin Layer T2 (μm) | R1=T2/T1 | Adhesiveness | Capacitance (F) | Resistance (mΩ) |
|---|---|---|---|---|---|---|
| Example 1 | 10 | 1 | 0.10 | OK | 65 | 11 |
| Example 2 | 10 | 10 | 1.00 | OK | 64 | 13 |
| Example 3 | 10 | 20 | 2.00 | OK | 62 | 16 |
| Comparative Example 1 | 10 | 25 | 2.50 | NG | 61 | 16 |

Fig. 3B

| | Thickness of Polarizable Layer T1 (μm) | Thickness of Resin Layer T2 (μm) | R1=T2/T1 | Adhesiveness | Capacitance (F) | Resistance (mΩ) |
|---|---|---|---|---|---|---|
| Example 4 | 30 | 1 | 0.03 | OK | 74 | 16 |
| Example 5 | 30 | 10 | 0.33 | OK | 72 | 19 |
| Example 6 | 30 | 20 | 0.67 | OK | 70 | 23 |
| Example 7 | 30 | 25 | 0.83 | OK | 69 | 24 |
| Example 8 | 80 | 10 | 0.125 | OK | 81 | 21 |
| Example 9 | 80 | 20 | 0.25 | OK | 75 | 29 |
| Comparative Example 2 | 80 | 1 | 0.013 | OK | 33 | 132 |

CAPACITOR

TECHNICAL FIELD

The present invention relates to a capacitor used in various fields such as a backup power supply and regeneration in various types of electronic appliances, hybrid electric vehicles, and fuel-cell electric vehicles, or for power storage.

BACKGROUND ART

Capacitors, which have high reliability in rapid charge and discharge, are used in various technical fields. A conventional electric double layer capacitor described in Patent Document 1 out of such capacitors includes positive and negative electrodes polarizable electrode layers mainly made of activated carbon. The electric double layer capacitor with aqueous electrolyte has a withstand voltage of 1.2V. The capacitor with organic electrolyte has a withstand voltage ranging from 2.5 to 3.3V.

Since energy of the capacitor is proportional to the square of its withstand voltage, the capacitor with the organic electrolyte (high withstand voltage) has higher energy than the capacitor with the aqueous electrolyte. Even the electric double layer capacitor with the organic electrolyte, however, has an energy density less than $1/10$ of that of a secondary battery, such as a lead-acid battery. Capacitors are required to have larger energy density.

It is known that, to improve the durability of such capacitors, a separator made of resin, such as polyethylene and polypropylene, is used.

A conventional capacitor includes a separator having a sheet shape for isolation between the positive and negative electrodes. In view of manufacturing and strength, the separator necessarily has a thickness of approximately 25 μm, thus being prevented from having a small thickness and a large capacitance.

Patent Document 1: JP10-270293A

SUMMARY OF THE INVENTION

A capacitor includes a first collector made of metal foil, a first electrode layer placed on a surface of the first collector and mainly containing a carbonaceous material, a resin layer provided on the first electrode layer, a second electrode provided on the resin layer and mainly containing a carbonaceous material, a second collector provided on the second electrode layer and made of metal foil, a case accommodating the first collector, the first electrode layer, the resin layer, the second electrode, and the second collector therein, and an electrolyte accommodated in the case. The resin layer has a non-woven fabric form of fibers made of resin irregularly bonded to one another. The fibers of the resin layer are entangled with the first electrode layer.

This capacitor can be thin and small.

REFERENCE NUMERALS

3 Collector (First Collector, Second Collector)
3D End of Collector
4 Electrode Layer (First Electrode Layer)
5 Resin Layer (First Resin Layer)
8A Through-Hole
14 Electrode Layer (Second Electrode Layer)
15 Resin Layer (Second Resin Layer)
51 Electrolyte
52 Case
53A Terminal (First Terminal)
53B Terminal (Second Terminal)

DETAILED DESCRIPTION OF PREFERRED EMBODIMENT

Figure 1A:
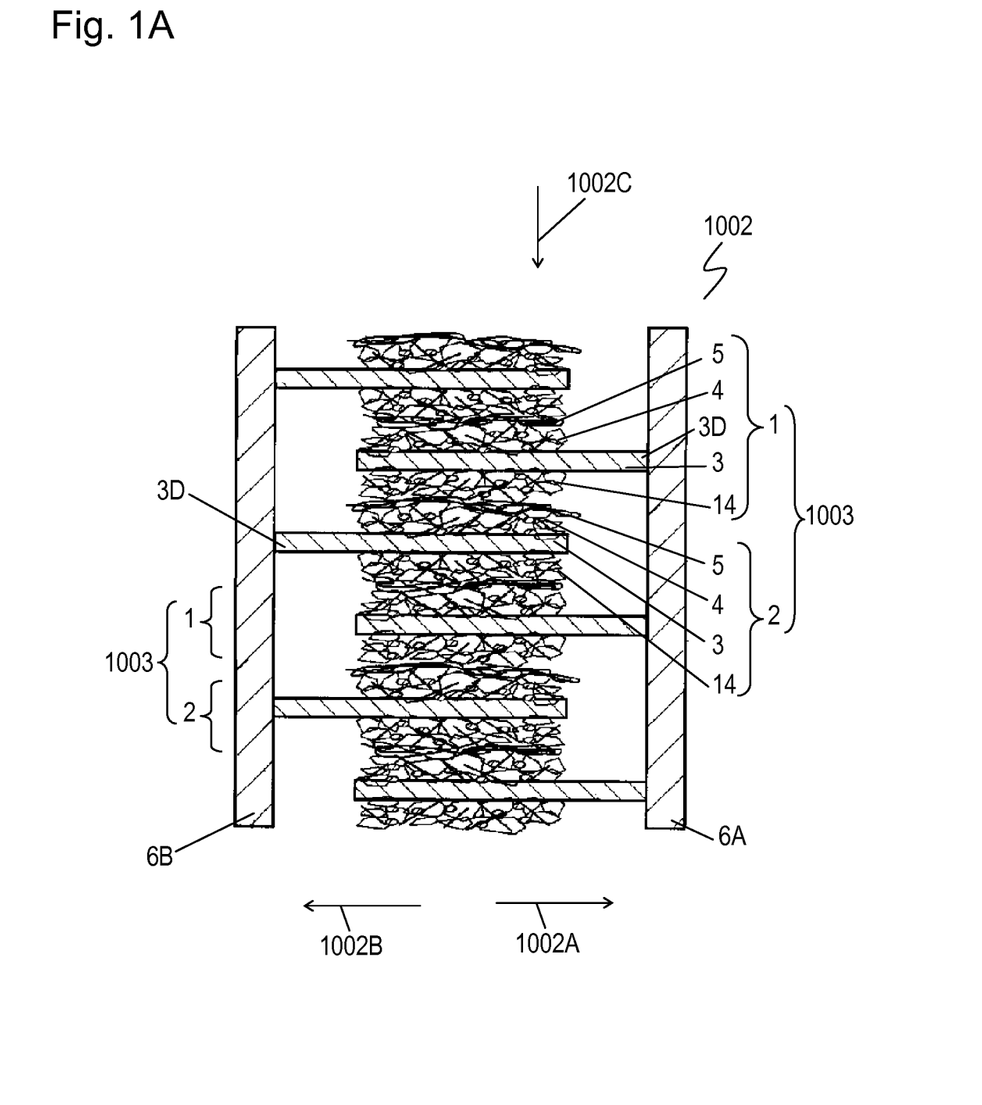
FIG. 1A is a sectional view of a capacitor element of a capacitor according to an exemplary embodiment of the present invention.
Figure 1B:
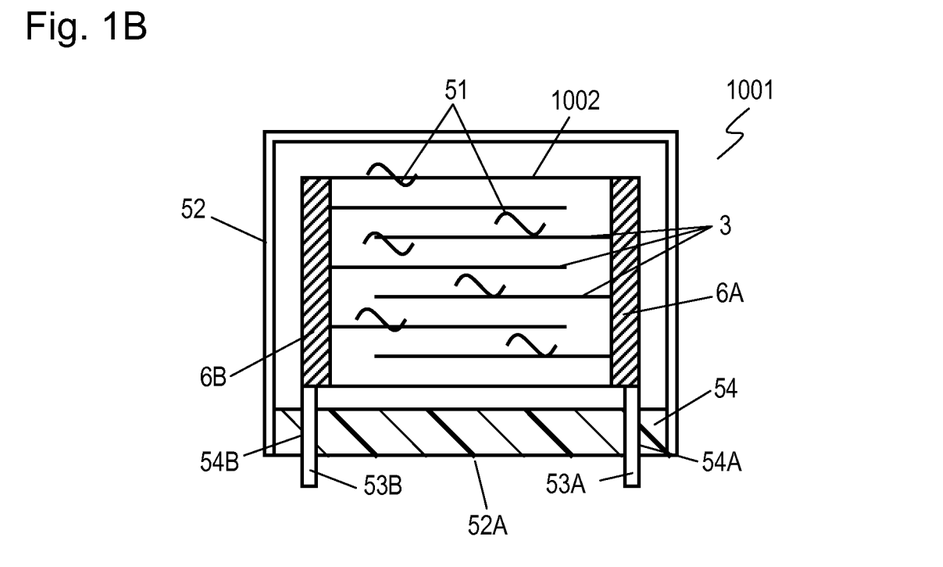
FIG. 1B is a sectional view of the capacitor according to the embodiment.
Figure 2:
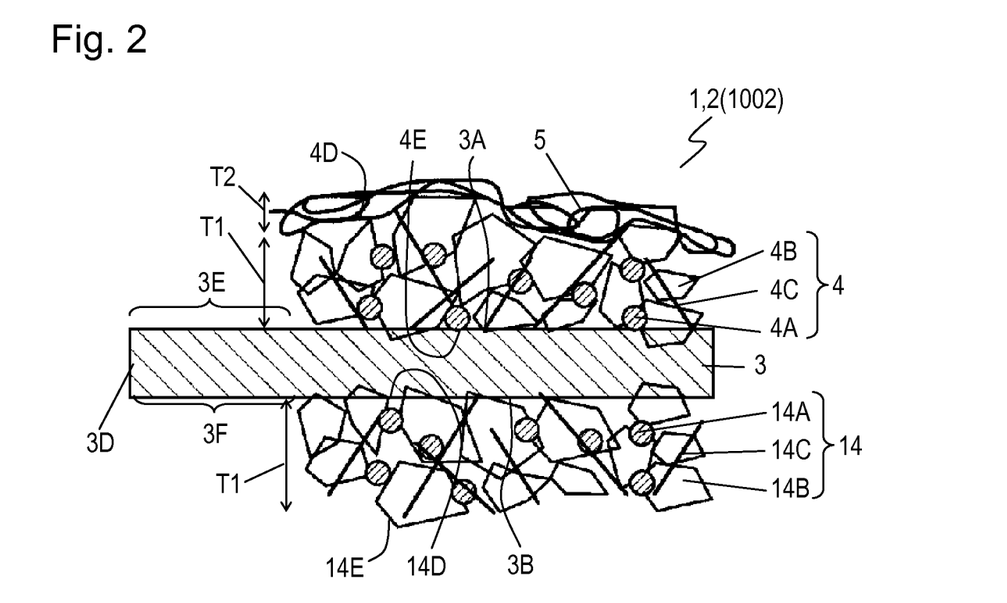
FIG. 2 is an enlarged sectional view of the capacitor element shown in FIG. 1A.

FIG. 1A is a sectional view of capacitor element 1002 of electric double layer capacitor 1001 according to an exemplary embodiment of the present invention. FIG. 1B is a sectional view of electric double layer capacitor 1001. FIG. 2 is an enlarged sectional view of capacitor element 1002. As shown in FIGS. 1A and 2, capacitor element 1002 includes positive electrode 1 and negative electrode 2. Collector 3 made of metal foil, such as aluminum foil, has surface 3A and surface 3B opposite to surface 3A. Each of positive electrode 1 and negative electrode 2 includes collector 3, polarizable electrode layer 4 mainly containing activated carbon powder 4A which is placed on surface 3A and exposes end 3D of collector 3, polarizable electrode layer 14 mainly containing activated carbon powder 14A which is provided placed on surface 3B and exposes end 3D of collector 3, and resin layer 5 having a non-woven fabric structure bonded onto surface 4D of polarizable electrode layer 4. That is, resin layer 5 has fibers unevenly bonded to one another. Polarizable electrode layer 4 has surface 4E situated on surface 3A of collector 3 and surface 4D opposite to surface 4E. Polarizable electrode layer 14 has surface 14D situated on surface 3B of collector 3 and surface 14E opposite to surface 14D.

Positive electrode 1 and negative electrode 2 overlap each other such that ends 3D of collectors 3 are directed alternately to directions 1002A and 1002B opposite to each other, providing capacitor unit 1003. Plural capacitor units 1003 are stacked. End 3D of the collector of positive electrode 1 is connected to collector plate 6A. End 3D of collector 3 of negative electrode 2 is connected to collector plate 6B, thus providing capacitor element 1002. As shown in FIG. 1B, electric double layer capacitor 1001 includes capacitor element 1002, electrolyte 51, and case 52 made of metal for accommodating capacitor element 1002 and electrolyte 51 therein.

A method of manufacturing electric double layer capacitors 1001 will be described below.

Aluminum foil having high purity with a thickness of approximately 22 μm is etched electrolytically in hydrochloric acid-based etching liquid to roughen a surface of the foil to produce collector 3.

Phenolic resin-based, activated carbon powder 4A and 14A with an average particle diameter of 5 μm are prepared. Conductive agents 4B and 14B made of acetylene black with an average particle diameter of 0.05 μm are prepared. Binders 4C and 14C made of carboxymethylcellulose (CMC) and polytetrafluoroethylene (PTFE) are prepared. Dispersion medium containing which is mixture of methanol and water is prepared. 10 parts of weight of activated carbon powder 4A (14A), 2 parts of weight of conductive agent 4B (14B), 1 part of weight of binder 4C (14C) are mixed and kneaded with a kneading apparatus while the dispersion medium is added to them, thereby providing paste having a predetermined viscosity. The paste is applied onto surfaces 3A and 3B so as to expose portions 3E and 3F of surfaces 3A and 3B including end 3D of collector 3. Collector 3 having the paste applied thereto is dried in atmosphere at a temperature of 85° C. for 5 minutes, thereby forming polarizable electrode layers 4 and 14 on surfaces 3A and 3B of collector 3, respectively.

Subsequently, resin layer 5 is bonded onto surface 4D of polarizable electrode layer 4 by the following method. The resin may be thermoplastic resin. Melting thermoplastic resin, such as polybutylene terephthalate (PBT) is injected with high-temperature, high-speed airflow from a die with a cap having a lot of apertures therein. The injected resin has fine fibrous form and accumulates on surface 4D of polarizable electrode layer 4 to form resin layer 5. The accumulating resin having the fibrous form has a non-woven fabric structure, namely has fibers unevenly bonded to one another. The resin having the fine fibrous form accumulated on resin layer 5 is bonded so as to are entangled with asperities on surface 4D of polarizable electrode layer 4. Resin layer 5 has a thickness of about 10 μm. After resin layer 5 is formed, collector 3 with polarizable electrode layers 4 and 14 and resin layer 5 formed thereon is cut into positive electrode 1 and negative electrode 2 having a predetermined size.

Then, positive electrode 1 and negative electrode 2 are stacked such that end 3D of collector 3 of positive electrode 1 and end 3D of collector 3 of negative electrode 2 are directed alternately in directions 1002A and 1002B opposite to each other, thereby producing plural capacitor units 1003. At this moment, resin layer 5 of positive electrode 1 is situated on surface 14E of polarizable electrode layer 14 of negative electrode 2. Next, plural capacitor units 1003 are stacked such that resin layer 5 of positive electrode 1 is situated on surface 14E of polarizable electrode layer 14 of negative electrode 2. After that, end 3D of collector 3 of positive electrode 1 is connected to collector plate 6A by laser welding, and end 3D of collector 3 of negative electrode 2 is connected to collector plate 6B by laser welding, thereby producing capacitor element 1002.

After that, terminals 53A and 53B are joined to collector plates 6A and 6B, respectively. Then, capacitor element 1002 and electrolyte 51 are accommodated into case 52 made of metal, such as aluminum, through opening 52A to impregnate capacitor element 1002 with electrolyte 51. Electrolyte 51 may employ 4-ethyl ammonium 4-fluorinated boron dissolved in propylene carbonate.

Next, sealing rubber 54 is fit into opening 52A of case 52. Terminals 53A and 53B are exposed outside case 52 through through-holes 54A and 54B provided in sealing rubber 54. After that, an outer circumference close to opening 52A of case 52 is shrunk inward and circularly, and an open end of metal case 52 is curled to seal opening 52A, thereby providing electric double layer capacitor 1001.

In electric double layer capacitor 1001 according to the embodiment, components, particularly collector 3, of each of positive electrode 1 and negative electrode 2 provides capacitor unit 1003 with mechanical strength. Collector plates 6A and provide capacitor element 1002 with mechanical strength, and hence, allow the mechanical strength of resin layer 5 as a separator to be unnecessary, thus allowing resin layer 5 to only an insulating property.

In electric double layer capacitor 1001, resin layer 5 is fixed tightly to polarizable electrode layer 4 by hydrogen bonding. Hence, resin layer 5 is made of material which can be bonded with polarizable electrode layer 4 by hydrogen bonding. Resin layer 5 is made of resin preferably containing halogen element in its chemical formula to cause the hydrogen bonding. Besides polybutylene terephthalate (PBT), resin layer 5 may be made of polyethylene (PE), polypropylene (PP), polyethylene terephthalate (PET), polyphenylene sulfide (PPS), aramid, polyimide, nylon, modified PP, modified PE, polyvinylidene fluoride (PVDF), or polytetrafluoroethylene (PTFE). These resins can be bonded to polarizable electrode layer 4 by hydrogen bonding with a large bonding strength. In order to have resistance to heat, resin layer 5 may be made more preferably of PBT, PET, PPS, aramid, polyimide, nylon, PVDF, or PTFE.

A conventional electric double layer capacitor including a separator that is a member separate from of polarizable electrode layers has a minimum thickness of 25 μm. Electric double layer capacitor 1001 according to the embodiment including resin layer 5 instead of a separator can have a minimum thickness less than 10 μm, and thus has a thin, small size, and a large capacitance.

Figure 3A:
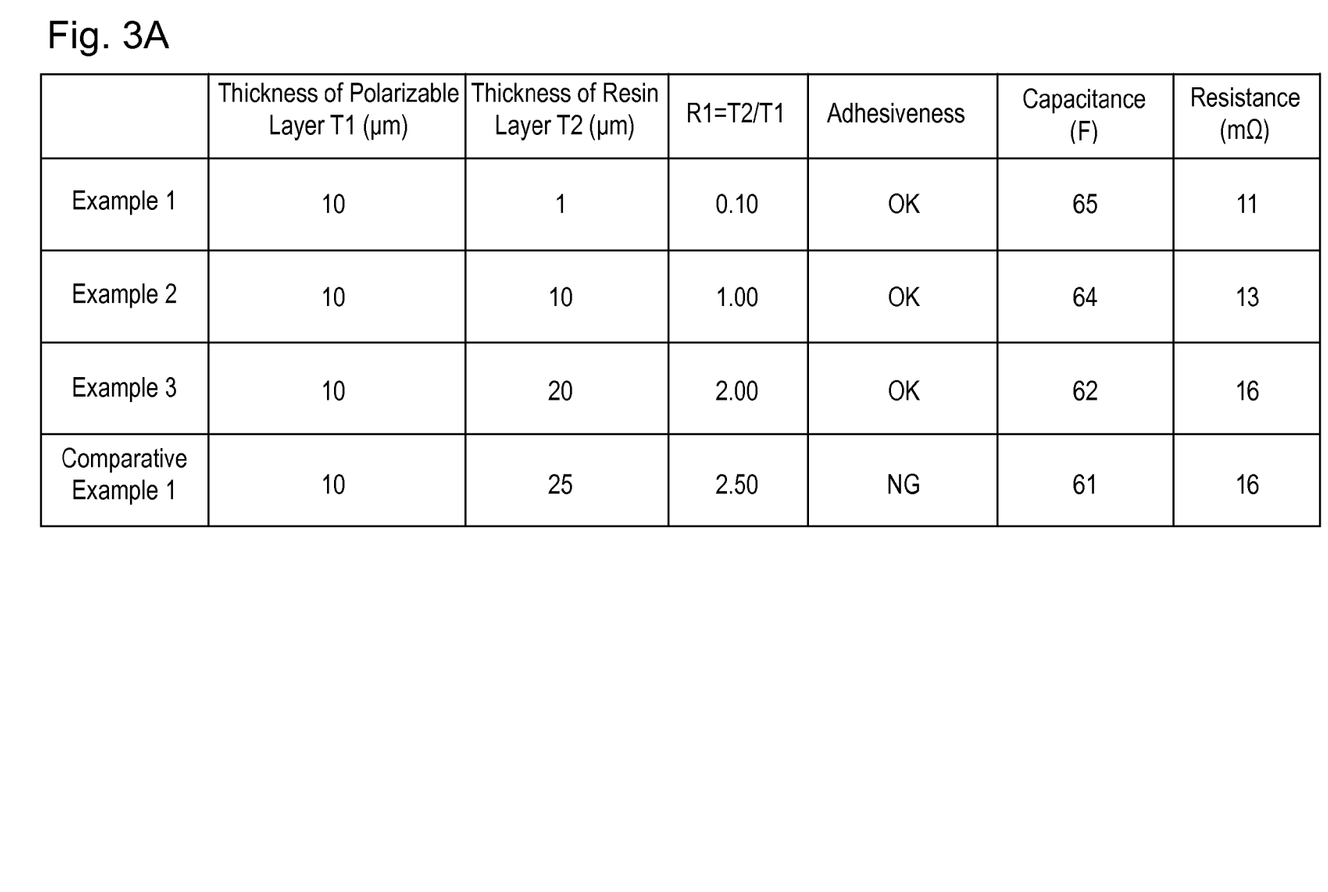
FIG. 3A shows evaluation results of the capacitor according to the embodiment.
Figure 3B:
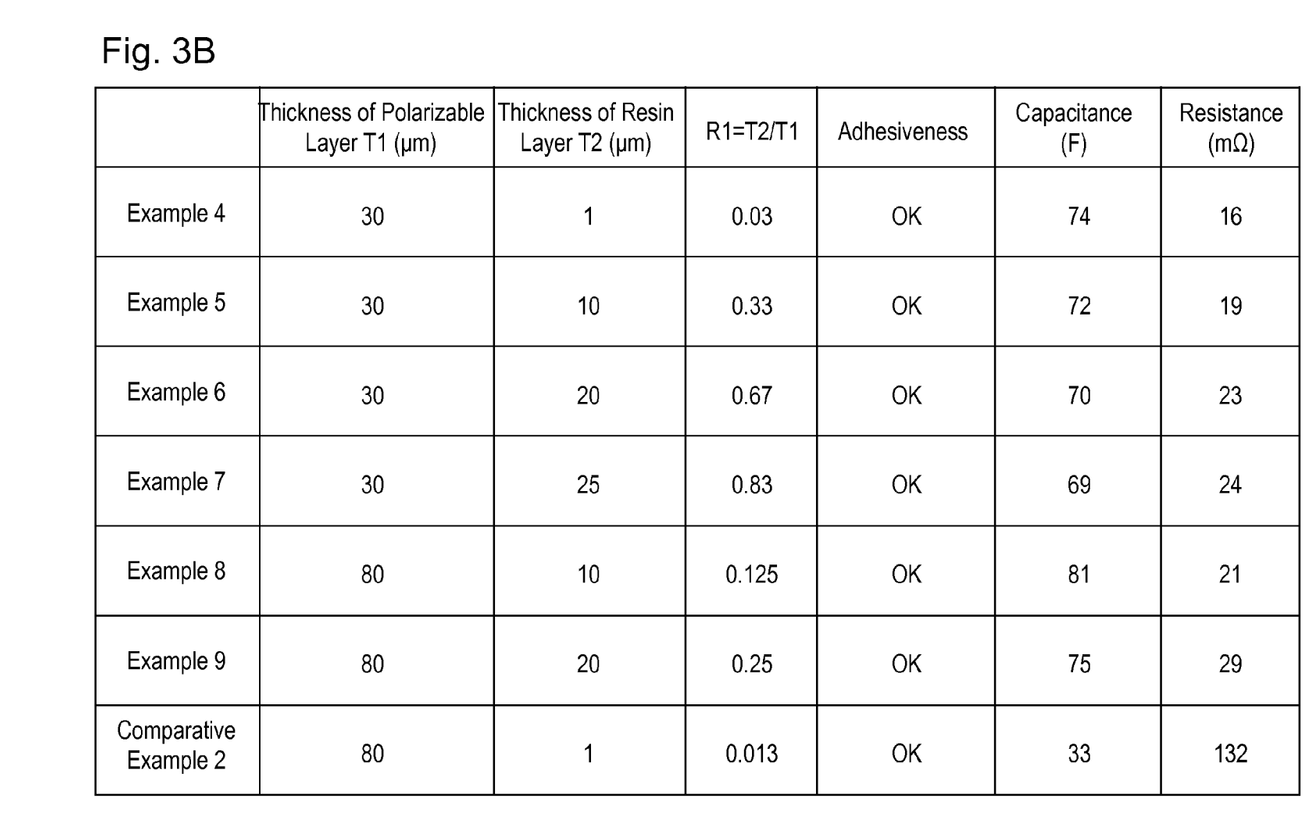
FIG. 3B shows evaluation results of the capacitor according to the embodiment.

Samples of Examples 1 to 9 and comparative examples 1 and 2 of electric double layer capacitor 1001 including polarizable electrode layers 4 and 14 with various thicknesses T1 and resin layer 5 with various thicknesses T2 were produced by the above method. Capacitor element 1002 of each sample had a cylindrical roll type with a diameter of 18 mm and a length of 50 mm. The samples were evaluated in the strength of bonding between resin layer 5 and polarizable electrode layer 4, capacitances, and resistances, which are shown in FIGS. 3A and 3B. A constant voltage was applied to the samples by feeding a constant current so that the samples were fully charged and completely discharged in 1 minute. The capacitances and the resistances were measured while the samples were discharged with a constant current after the charging.

The strength of bonding between resin layer 5 and polarizable electrode layer 4 was evaluated according to "Adhesives. Test Method of Peel Bonding Strength Part 1; 90-degree peel" (JIS-K6854-1). In FIGS. 3A and 3B, a sample that represents destruction of resin layer 5 or peeling between polarizable electrode layer 4 and resin layer 5 is marked with "NG"; otherwise, "OK".

The ratio R1 of thickness T2 of resin layer 5 to thickness T1 of polarizable electrode layers 4 and 14 for Examples 1 to 9 ranges from 0.03 and 2.00. These samples did not represent the peeling between resin layer 5 and each of polarizable electrode layers 4 and 14, and exhibited favorable capacitances and resistances. Particularly, samples of Examples 1, 2, 4, 5, and 8 includes resin layer 5 with a thickness of 10 μm which is smaller than a thickness of 20 μm of the separator of the conventional electric double layer capacitor.

The separator of the conventional electric double layer capacitor made mainly of cellulose has a thickness of 25 μm for mass production. In double layer capacitor 1001 according to the embodiment including fibriform resin layer 5 supported unitarily with polarizable electrode layer 4, the thickness of resin layer 5 can be less than 20 μm.

In a sample of comparative example 1 having ratio R1 of a large value, 2.50, a force of 17 N/m causes resin layer 5 to be peeled. If ratio R1 is large, resin layer 5 itself has a small strength. Such resin layer 5 may be peeled off when a capacitor unit is rolled to produce a capacitor element, possibly short-circuiting between positive electrode 1 and negative electrode 2. Resin layer 5 having fiber form adheres to polarizable electrode layer 4 by entangling with polarizable electrode layer 4 physically. As the ratio R1 of thickness T2 of resin layer 5 to thickness T1 of polarizable electrode layer 4) increases, some of fibriform resin of resin layer 5 cannot entangle with polarizable electrode layer 4 and may divide resin layer 5 itself.

A sample of comparative example 2 having ratio R1 of a small value, 0.013, has significantly a small capacitance and a large resistance. Resin layer 5 of this sample cannot retain a large amount of the electrolyte, accordingly prevents the capacitor from having a small capacitance and a large resistance.

In electric double layer capacitor 1001 according to the embodiment, fibriform resin of resin layer 5 entangles with polarizable electrode layers 4 and 14 physically to bond resin layer 5 to polarizable electrode layers 4 and 14. Hydroxyl groups and carboxyl groups on surfaces 4D and 14E of polarizable electrode layers 4 and 14 are bonded mainly with hydroxyl groups and carboxyl groups on the surface of fibriform resin of resin layer 5 by hydrogen bonding to provide a chemical bonding force. Resin layer 5 is bonded securely with polarizable electrode layers 4 and 14 by the physical and chemical bonding forces.

Figure 4:
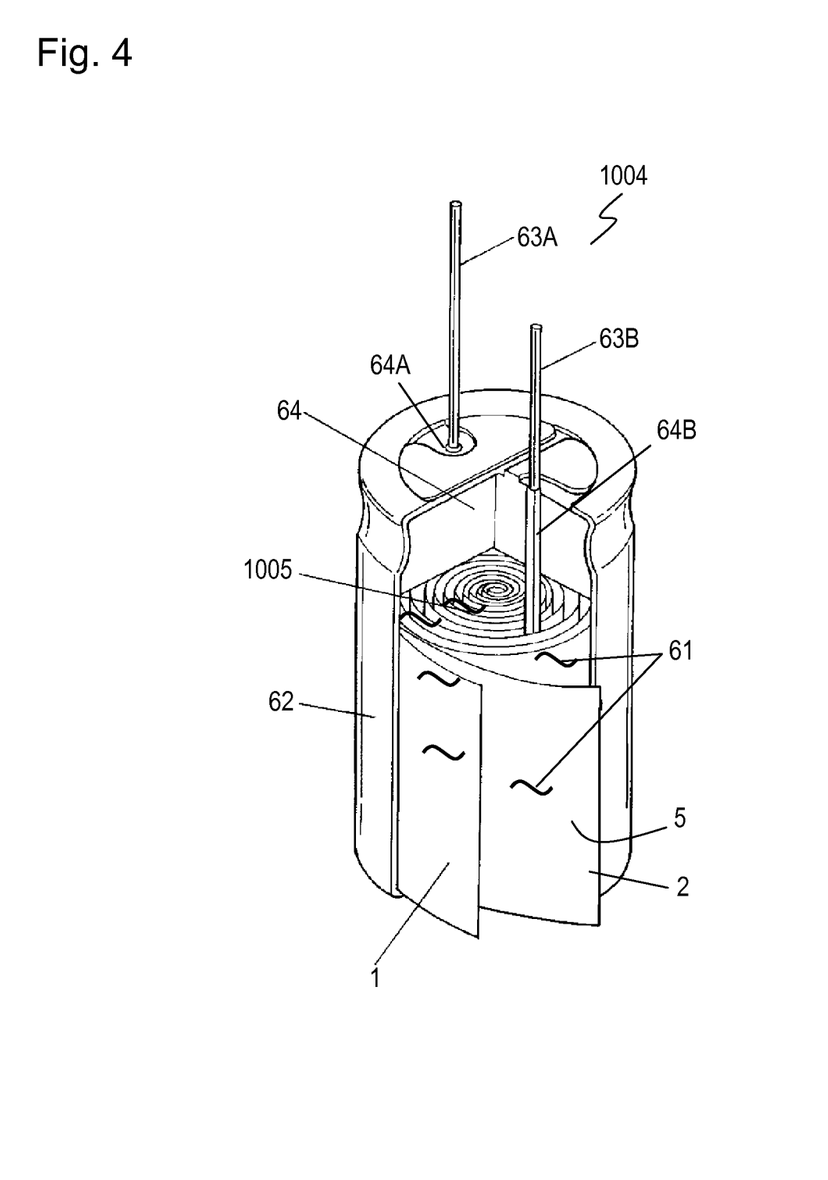
FIG. 4 is a perspective view of another capacitor according to the embodiment.

FIG. 4 is a perspective view of another electric double layer capacitor 1004 according to the embodiment. In FIG. 4, components identical to those of electric double layer capacitor 1001 shown in FIGS. 1A and 1B are denoted by the same reference numerals, and their description will be omitted. Electric double layer capacitor 1004 includes roll-type capacitor element 1005 produced by stacking and rolling positive electrode 1 and negative electrode 2. Terminals 63A and 63B are connected to positive electrode 1 and negative electrode 2, respectively. Capacitor element 1005 with terminals 63A and 63B connected thereto is accommodated in case 62 made of metal together with electrolyte 61. Opening 2 of case 62 is sealed with sealing rubber 64. Sealing rubber 64 has through-holes 64A and 64B formed therein. Terminals 63A and 63B are exposed outside case 62 through through-holes 64A and 64B. In electric double layer capacitor 1004, resin layer 5 and polarizable electrode layers 4, 14 of positive electrode 1 and negative electrode 2 are bonded securely to each other by the physical and chemical bonding forces, thus allowing roll-type capacitor element 1005 to be produced easily. Roll-type capacitor element 1005 can be produced at higher productivity at lower cost than stacked-type capacitor element 1002, and can efficiently release heat generated upon rapid charging and discharging of eth capacitor with a large current. Hence, electric double layer capacitor 1004 including roll-type capacitor element 1005 can be used for devices including an industrial device, such as a hybrid vehicle, power shovel, and crane, with a large current passing the element, Electric double layer capacitor 1001 according to the embodiment has a small resistance as well as a large capacitance.

Resin layer 5 of electric double layer capacitor 1001 does not include binder causing deterioration with time. The sample of Example 7 shown in FIG. 3B includes resin layer 5 with a thickness T2 of 25 μm. That is, thickness T2 of resin layer 5 of electric double layer capacitor 1001 can be 20 μm or larger. The sample of Example 7 has the initial capacitance and resistance substantially equal to those of the conventional capacitor including the separator, but is prevented from having a decrease of the capacitance with time and an increase of the resistance with time. The separator of the conventional capacitor contains binder to retain its shape. The binder decomposes when charging and discharging, adheres to the proximity of a polarizable electrode. The adhering binder decreases the capacitance of the capacitor and increases the resistance.

Resin layer 5 of electric double layer capacitor 1001 according to the embodiment which does not contain binder prevents the capacitance from decreasing with time due to the binder and prevents the resistance from increasing with time due to the binder.

Figure 5:
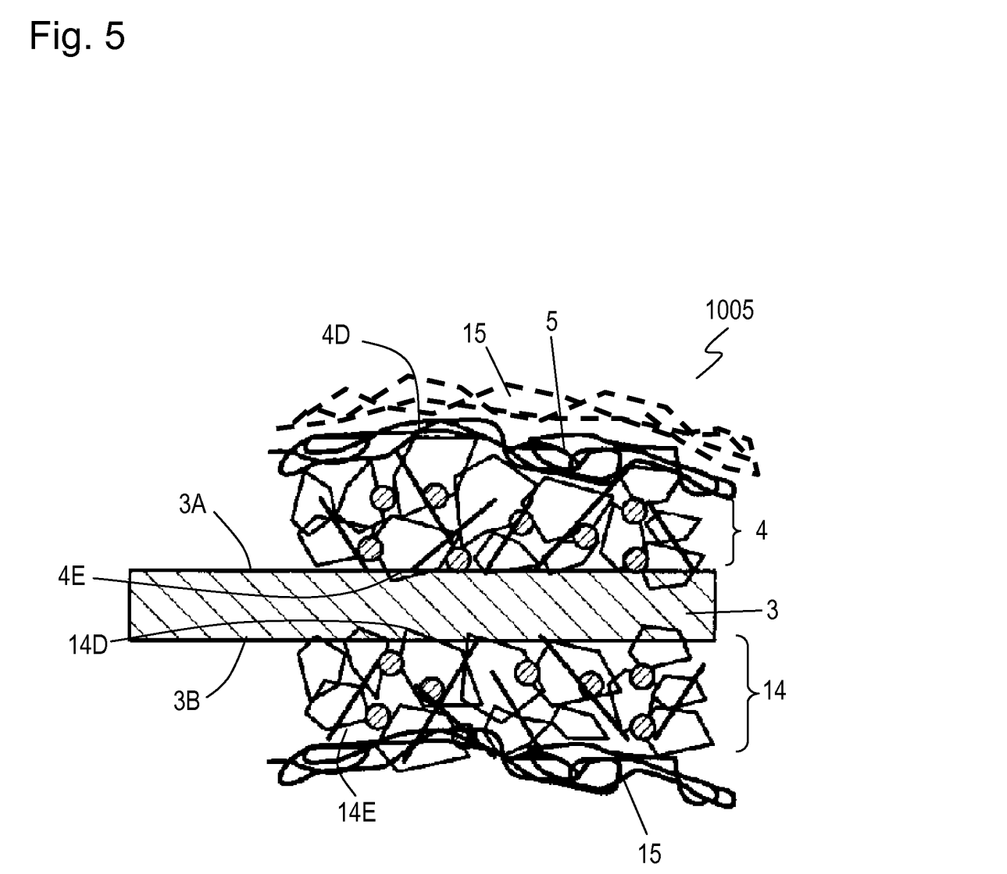
FIG. 5 is an enlarged sectional view of another capacitor element according to the embodiment.

FIG. 5 is an enlarged sectional view of another capacitor element 1005 according to the embodiment. In FIG. 5, components identical to those of capacitor element 1002 shown in FIG. 2 are denoted by the same reference numerals, and their description will be omitted. In positive electrode 1 and negative electrode 2 of capacitor element 1002 shown in FIG. 2, resin layer 5 is bonded to surface 4D of polarizable electrode layer 4. Positive electrode 1 and negative electrode 2 of capacitor element 1005 shown in FIG. 5 further include resin layer 15 bonded to surface 14E of polarizable electrode layer 14. Resin layer 15 has the same structure as that of resin layer 5, and is bonded to surface 14E of polarizable electrode layer 14. Resin layers 5 and 15 overlap each other in capacitor element 1002 shown in FIGS. 1A and 1B. Resin layer 5 faces surface 3A of collector 3 across polarizable electrode layer 4. Resin layer 15 faces surface 3B of collector 3 across polarizable electrode layer 14.

In capacitor element 1005 shown in FIG. 5, resin layers 5 and 15 may be made of resin with resistance to strong acid. The resistance to strong acid suppresses deterioration of positive electrode 1. The resins with resistance to acid resistance may be PE, PP, PVDF, PET, PBT, PPS, aramid, modified PP, and modified PE. The resins can be preferably PP or modified PP, and more preferably PET, PBT, PPS, or aramid, which increases resistance to heat.

Here, modified PP or modified PE may be used as long as it has higher resistance to acid, alkali, and heat than regular PP or PE, and thus acid-modified PP or acid-modified PE is used. The acid modification includes carboxylic acid modification and maleic acid modification, and preferably carboxylic acid modification is used.

In capacitor element 1005 shown in FIG. 5, resin layers 5 and 15 may be made of resin with resistance to strong alkali. The resistance to strong alkali prevents deterioration of negative electrode 2. Resin with resistance to strong alkali may be cellulosic resin, PP, PBT, PPS, polyamide, or aramid, and may be preferably cellulosic resin, PP, PBT, or PPS.

In capacitor element 1005 shown in FIG. 5, resin layer 5 may be made of resin with resistance to strong acid, and resin layer 15 has resistance to strong alkali. Resin layer 5 contacts resin layer 15 in capacitor unit 1003 and capacitor element 1002. This structure provides resistance to both strong acid and strong alkali, thus allowing the electrode shown in FIG. 5 to be used for both positive electrode 1 and negative electrode 2. Similarly, resin layer 15 may be made of resin with resistance to strong acid, and resin layer 5 may be made of resistance to strong alkali.

Alternatively, resin layers 5 and 15 may be made of material containing resin with resistance to strong acid and resin with resistance to strong alkali.

Instead, positive electrode 1 and negative electrode 2 may be heated at a temperature higher than the melting point of the resin forming resin layer 5. Then, a portion of resin layer 5 melts and enters in polarizable electrode layer 4 from surface 4D of polarizable electrode layer 4, thereby further enhancing the bond strength between resin layer 5 and polarizable electrode layer 4. The melting portion of resin layer 5 may contact and fusion-adhere to portion 3E of collector 3 exposed from polarizable electrode layer 4, and allows resin layer 5 to be bonded securely to collector 3, accordingly allowing fixing resin layer 5 securely to polarizable electrode layer 4.

In electricity double layer capacitor 1001, terminal 53A and terminal 53B are joined to collector plate 6A joined to positive electrode 1 and collector plate 6B joined to negative electrode 2, respectively. Terminals 53A and 53B may be directly joined to ends 3D of collectors 3 of electrodes 1 and 2, respectively.

Figure 6A:
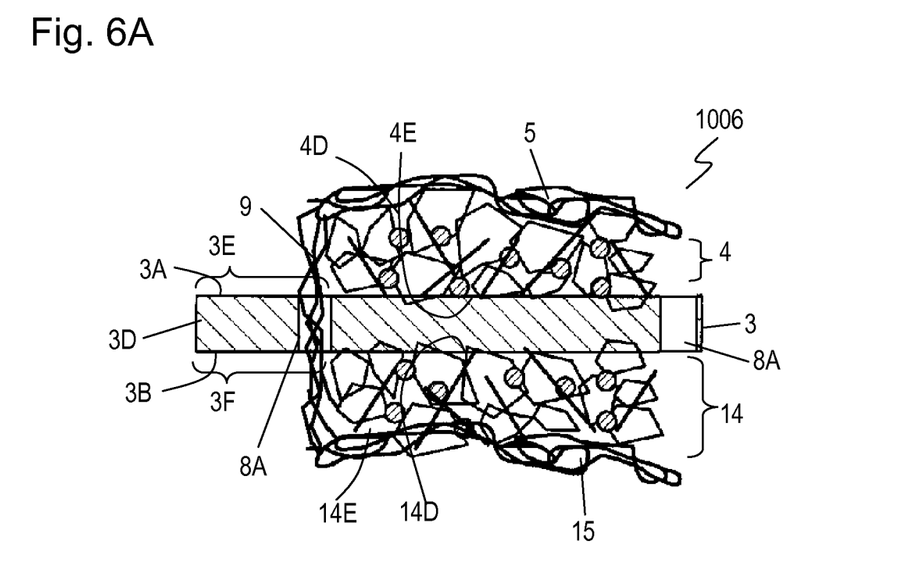
FIG. 6A is an enlarged sectional view of still another capacitor element according to the embodiment.

FIG. 6A is an enlarged sectional view of further capacitor element 1006 according to the embodiment. In FIG. 6A, components identical to those of capacitor element 1005 shown in FIG. 5 are denoted by the same reference numerals, and their description will be omitted. In capacitor element 1006, through-hole 8A communicating with surfaces 3A and 3B of collector 3 is provided in portion 3E of collector 3 which does not having polarizable electrode layers 4 and 14 thereon to be exposed from polarizable electrode layers 4 and 14. Resin layer 5 bonded to surface 4D of polarizable electrode layer 4 has portion 9 which extends through through-hole 8A, which is bonded to polarizable electrode layer 14, and which is connected to resin layer 15. This structure increases the area of a portion of resin layer 5 contacts polarizable electrode layer 4, accordingly fixing resin layers 5 and 15 to polarizable electrode layers 4 and 14 securely.

Figure 6B:
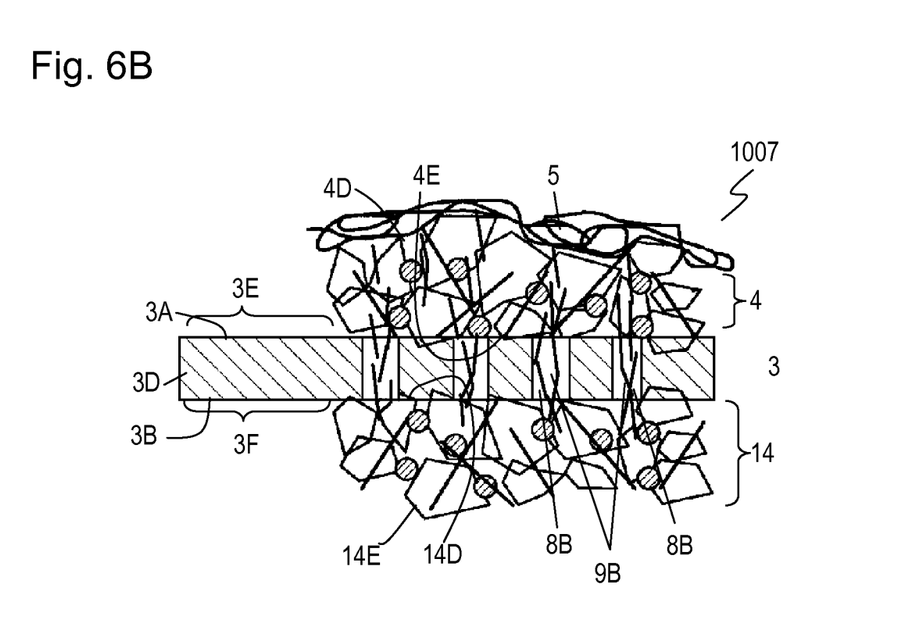
FIG. 6B is an enlarged sectional view of a further capacitor element according to the embodiment.

FIG. 6B is an enlarged sectional view of further capacitor element 1007 according to the embodiment. In FIG. 6B, components identical to those of capacitor element 1002 shown in FIG. 2 are denoted by the same reference numerals, and their description will be omitted. In capacitor element 1007, through-hole 8B communicating with surfaces 3A and 3B of collector 3 is provided in collector between polarizable electrode layers 4 and 14. When spraying resin onto surface 4D of polarizable electrode layer 4 so as to form resin layer 5 on polarizable electrode layer 4, air is sucked through through-hole 8B from surface 3B of collector 3. This operation causes resin forming resin layer 5 to enter into polarizable electrode layer 4 and to reach polarizable electrode layer 14 through through-hole 8B. Thereby, fine, fibriform resin fiber 9B made of the same material as that of resin layer 5 is formed, and resin fiber 9B is placed inside polarizable electrode layer 4 to reach an inside of polarizable electrode layer 14 through through-hole 8B. Resin fiber 9B bonds resin layer 5 securely to surface 4D of polarizable electrode layer 4, thereby reliably preventing short-circuiting between positive electrode 1 and negative electrode 2.

Figure 7:
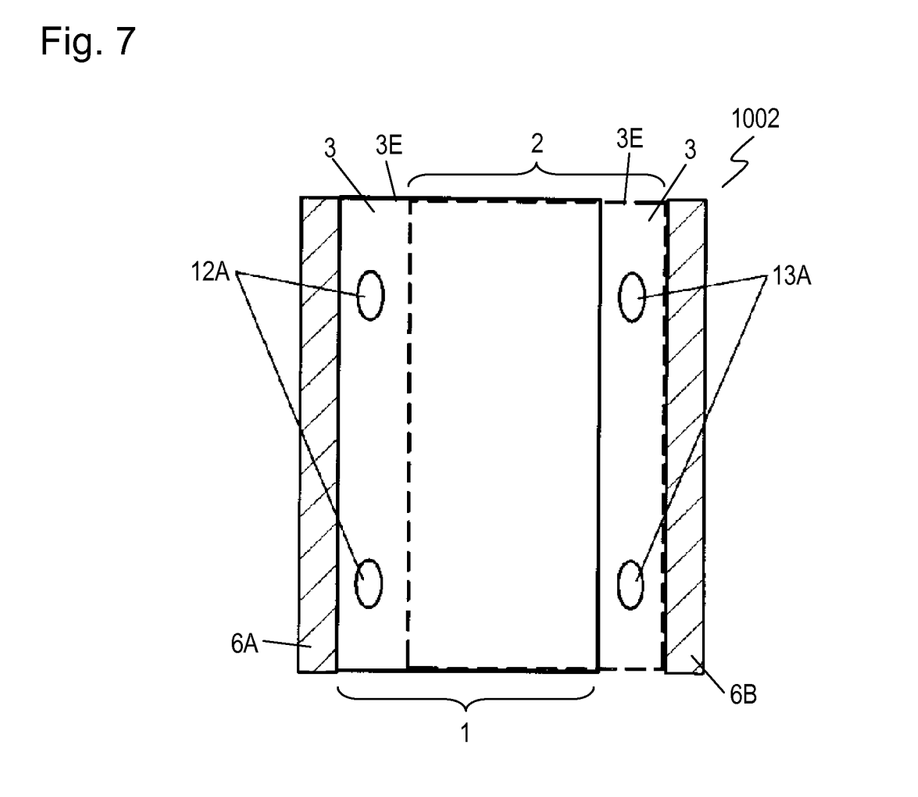
FIG. 7 is a plan view of a capacitor element of a further capacitor according to the embodiment.

FIG. 7 is a plan view of capacitor element 1002 shown in FIG. 1A as seen from direction 1002C. Portion 3E of collector 3 of positive electrode 1 has two through-holes 12A formed therein. Portion 3E of collector 3 of negative electrode 2 has two through-holes 13A formed therein. The distance between two through-holes 12A is different from the distance between two through-holes 13A.

Plural capacitor units 1003 each formed by stacking positive electrode 1 and negative electrode 2 are stacked to form capacitor element 1002. Through-holes 12A and 13A are aligned to connect collectors 3 of positive electrode 1 and negative electrode 2 to collector plates 6A and 6B accurately by laser welding.

In capacitor element 1006 shown in FIG. 6A, through-hole 8A formed in collector 3 may function as through-holes 12A and 13A for positioning. In capacitor element 1007 shown in FIG. 6B, through-hole 8B formed in collector 3 may function as through-holes 12A and 13A for positioning.

Through-holes 12A and 13A have an elliptical shape, but may have a circular shape. Through-holes 12A and 13A having the elliptical shape can prevent rotation of positive electrode 1 and negative electrode 2. The distance between two through-holes 12A may be identical to or different from the distance between two through-holes 13A. The different distances can prevent rotation of positive electrode 1 and negative electrode 2.

Figure 8:
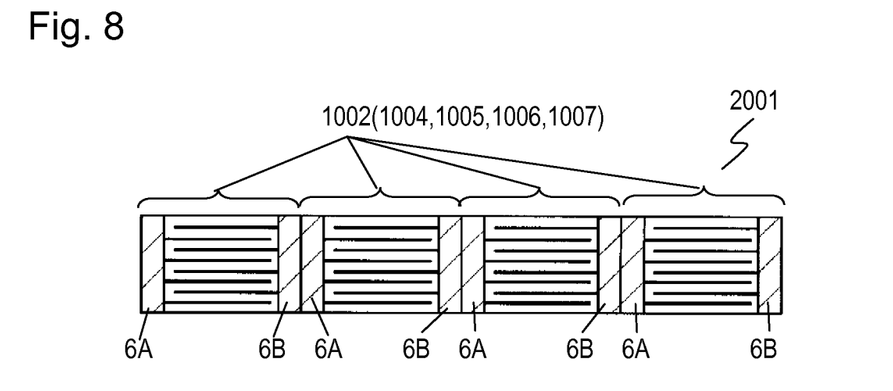
FIG. 8 is a sectional view of a further capacitor according to the embodiment.

FIG. 8 is a sectional view of further capacitor element 2001 according to the embodiment. In FIG. 8, components identical to those of capacitor element 1002 shown in FIG. 1A are denoted by the same reference numerals, and their description will be omitted. Capacitor element 2001 includes plural capacitor elements 1002 (1004, 1005, 1006, 1007) connected to one another. In capacitor element 2002, plural capacitor elements 1002 (1004, 1005, 1006, 1007) are connected serially, but may be connected by another manner, such as parallel connection.

Electric double layer capacitor 1001 according to the embodiment may be applicable to a capacitor including a collector, a carbonaceous material provided on a surface of the collector, and lithium ions stored in the carbonaceous material. This case requires a process for occluding lithium ions into the carbonaceous material (a pre-doping process). In this case, if a lithium source is provided directly on the surface of the polarizable electrode layer of the negative electrode in this process, a resin layer cannot be provided on the surface of the polarizable electrode layer of the negative electrode, but can be provided on the surface of the polarizable electrode layer of the positive electrode, providing the same effects.

In addition to lithium ions that are occluded and desorbed into a carbonaceous material, a capacitor using rare earthes (e.g. lanthanum ions) that are occluded and desorbed into alkali metal (e.g. sodium ions, potassium ions), alkali-earth metal, and fullerene provides the same effects.

In the case that the carbonaceous material has therein anions, not cations, occluded therein, a resin layer provided on an electrode layer of another electrode than the electrode performing occlusion and desorption provides the same effects, namely, completes the pre-doping process in a short time while decreasing the resistance and increasing the capacitance.

INDUSTRIAL APPLICABILITY

A capacitor according to the present invention can be thin and small, and is useful for a backup power supply and regeneration in hybrid electric vehicles and fuel-cell electric vehicle.

The invention claimed is:
1. A capacitor comprising:
   a first collector having a first surface and a second surface opposite to the first surface, the first collector being made of metal foil;
   a first electrode layer placed on the first surface of the first collector, the first electrode layer mainly containing a carbonaceous material;
   a resin layer provided on the first electrode layer;

a second electrode provided on the resin layer, the second electrode layer mainly containing a carbonaceous material;
a second collector having a first surface situated on the second electrode layer and a second surface opposite to the first surface of the second collector, the second collector being made of metal foil;
a case accommodating the first collector, the first electrode layer, the resin layer, the second electrode, and the second collector therein; and
an electrolyte accommodated in the case, wherein
the resin layer has a non-woven fabric form of fibers made of resin irregularly bonded to one another, and
the fibers of the resin layer are entangled with the first electrode layer.

2. The capacitor of claim 1, wherein a ratio of a thickness of the resin layer to a thickness of the first electrode layer ranges from 0.03 to 2.00.

3. The capacitor of claim 1, wherein
the first surface of the first collector has a portion exposed from the first electrode layer, and
the first surface of the second collector has a portion exposed from the second electrode layer.

4. The capacitor of claim 3, wherein
the portion of the first collector includes an end of the first collector, and
the portion of the second collector includes an end of the second collector.

5. The capacitor of claim 4, further comprising:
a first terminal connected to the end of the first collector; and
a second terminal connected to the end of the second collector.

6. The capacitor of claim 3, wherein
the portion of the first collector has a through-hole therein communicating with the first surface and the second surface of the first collector, and
the portion of the second collector has a through-hole therein communicating with the first surface and the second surface of the second collector.

7. The capacitor of claim 3, A capacitor comprising:
a first collector having a first surface and a second surface opposite to the first surface, the first collector being made of metal foil;
a first electrode layer placed on the first surface of the first collector, the first electrode layer mainly containing a carbonaceous material;
a resin layer provided on the first electrode layer;
a second electrode provided on the resin layer, the second electrode layer mainly containing a carbonaceous material;
a second collector having a first surface situated on the second electrode layer and a second surface opposite to the first surface of the second collector, the second collector being made of metal foil;
a case accommodating the first collector, the first electrode layer, the resin layer, the second electrode, and the second collector therein; and
an electrolyte accommodated in the case, wherein
the resin layer has a non-woven fabric form of fibers made of resin irregularly bonded to one another, wherein
the first surface of the first collector has a portion exposed from the first electrode layer, and
the first surface of the second collector has a portion exposed from the second electrode layer, and
wherein the resin layer fusion-adheres to the portion of the first collector.

8. The capacitor of claim 7, wherein the resin layer is heat-treated at a temperature higher than a melting point of the resin.

9. The capacitor of claim 1, wherein the resin layer is heat-treated at a temperature higher than a melting point of the resin.

10. A capacitor comprising:
a first collector having a first surface and a second surface opposite to the first surface, the first collector being made of metal foil;
a first electrode layer placed on the first surface of the first collector, the first electrode layer mainly containing a carbonaceous material;
a resin layer provided on the first electrode layer;
a second electrode provided on the resin layer, the second electrode layer mainly containing a carbonaceous material;
a second collector having a first surface situated on the second electrode layer and a second surface opposite to the first surface of the second collector, the second collector being made of metal foil;
a case accommodating the first collector, the first electrode layer, the resin layer, the second electrode, and the second collector therein; and
an electrolyte accommodated in the case, wherein
the resin layer has a non-woven fabric form of fibers made of resin irregularly bonded to one another,
wherein the first collector has a through-hole therein communicating with the first surface and the second surface of the first collector, and
the resin layer extends to pass through the through-hole.

11. The capacitor of claim 1, wherein the resin of the resin layer is one of polyethylene, polypropylene, polyethylene terephthalate, polybutylene terephthalate, polyphenylene sulfide, aramid, polyimide, nylon, modified polypropylene, modified polyethylene, polyvinylidene fluoride, and polytetrafluoroethylene.

12. The capacitor of claim 1, wherein the resin layer has resistance to acid.

13. The capacitor of claim 1, wherein the resin layer has resistance to alkali.

14. The capacitor of claim 1, wherein the resin layer includes
a first resin layer facing the first surface of the first collector across the first electrode layer, the first resin layer being resistant to acid; and
a second resin layer facing the first surface of the second collector across the second electrode layer, the second resin layer being resistant to alkali.

15. The capacitor of claim 1, wherein
the first electrode layer has a surface having asperities, and
the fibers of the resin layer are entangled with the asperities of the surface of the first electrode layer.

16. The capacitor of claim 1, wherein the resin layer is bonded to the first electrode layer by hydrogen bonding.

17. The capacitor of claim 10, wherein the through-hole is provided in a portion of the first collector, the portion of the first collector contacting the first electrode layer.

18. The capacitor of claim 1, wherein the fibers made of resin are bonded to one another without a binder.

19. The capacitor of claim 1, wherein the fibers are entangled with the carbonaceous material of the first electrode.

* * * * *